(12) United States Patent
Strandborg et al.

(10) Patent No.: US 11,863,786 B2
(45) Date of Patent: Jan. 2, 2024

(54) METHOD OF TRANSPORTING A FRAMEBUFFER

(71) Applicant: Varjo Technologies Oy, Helsinki (FI)

(72) Inventors: Mikko Strandborg, Hangonkylä (FI); Oiva Arvo Oskari Sahlsten, Salo (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/326,820

(22) Filed: May 21, 2021

(65) Prior Publication Data

US 2022/0377372 A1     Nov. 24, 2022

(51) Int. Cl.
| | |
|---|---|
| *H04N 19/59* | (2014.01) |
| *H04N 19/172* | (2014.01) |
| *G06T 3/40* | (2006.01) |
| *H04N 21/44* | (2011.01) |
| *H04N 21/4402* | (2011.01) |

(52) U.S. Cl.
CPC ........... *H04N 19/59* (2014.11); *G06T 3/4076* (2013.01); *H04N 19/172* (2014.11); *H04N 21/44004* (2013.01); *H04N 21/440263* (2013.01)

(58) Field of Classification Search
CPC ................ H04N 19/59; H04N 19/172; H04N 21/44004; H04N 21/440263; G06T 3/4076
See application file for complete search history.

(56) References Cited

U.S. PATENT DOCUMENTS

| | | | | |
|---|---|---|---|---|
| 5,608,539 A | * | 3/1997 | Sakamoto | ............... H04N 19/63 382/148 |
| 5,682,249 A | * | 10/1997 | Harrington | ............... H04N 1/64 358/1.9 |
| 6,377,266 B1 | * | 4/2002 | Baldwin | .................... G06T 1/20 345/506 |
| 6,628,294 B1 | * | 9/2003 | Sadowsky | ........... G06F 12/1027 345/568 |
| 6,677,952 B1 | * | 1/2004 | Baldwin | .................... G06T 1/60 345/552 |

(Continued)

FOREIGN PATENT DOCUMENTS

WO     2020033875 A1     2/2020

OTHER PUBLICATIONS

European Patent Office, Extended European Search Report, Application No. 22170252.5, dated Aug. 10, 2022, 12 pages.

*Primary Examiner* — Peter D Le
(74) *Attorney, Agent, or Firm* — Ziegler IP Law Group LLC

(57) ABSTRACT

A method of transmitting image data in an image display system, includes dividing the image data into framebuffers, and for each framebuffer: dividing the framebuffer into a number of vertical stripes, each stripe including one or more scanlines, dividing each vertical stripe into at least a first and a second block, each of the first and the second block comprising pixel data to be displayed in an area of the image, and storing first pixel data in the first block with a first resolution and second pixel data in the second block having a second resolution which is lower than the first resolution, transmitting the framebuffer over the digital display interface to a decoder unit, and unpacking the framebuffer, including upscaling the pixel data in the second block to compensate for the lower second resolution and optionally upscaling the pixel data in the first block.

18 Claims, 3 Drawing Sheets

(56) References Cited

U.S. PATENT DOCUMENTS

| | | | | |
|---|---|---|---|---|
| 8,345,762 B2* | 1/2013 | Vieron | | H04N 19/105 |
| | | | | 375/240.23 |
| 8,560,753 B1* | 10/2013 | Hobbs | | G09G 5/14 |
| | | | | 710/72 |
| 9,635,357 B2* | 4/2017 | Zhang | | H04N 19/44 |
| 9,654,360 B1* | 5/2017 | Kellicker | | H04L 65/80 |
| 10,984,758 B1* | 4/2021 | Croxford | | G09G 5/391 |
| 2002/0041632 A1* | 4/2002 | Sato | | H04N 19/112 |
| | | | | 375/E7.193 |
| 2002/0051583 A1* | 5/2002 | Brown | | G06T 9/007 |
| | | | | 382/299 |
| 2002/0118759 A1* | 8/2002 | Enficiaud | | H04N 19/70 |
| | | | | 375/240.19 |
| 2004/0148551 A1* | 7/2004 | Kawahara | | H04N 9/7921 |
| | | | | 714/48 |
| 2006/0170689 A1* | 8/2006 | Maier | | B60K 35/00 |
| | | | | 345/629 |
| 2006/0188024 A1* | 8/2006 | Suzuki | | H04N 19/124 |
| | | | | 375/E7.122 |
| 2006/0265601 A1* | 11/2006 | Zhu | | H04L 9/0637 |
| | | | | 713/184 |
| 2007/0046698 A1* | 3/2007 | Nam | | H04M 1/72427 |
| | | | | 455/566 |
| 2007/0058875 A1* | 3/2007 | Tabata | | H04N 1/41 |
| | | | | 375/E7.184 |
| 2007/0086519 A1* | 4/2007 | Lim | | H04N 21/2662 |
| | | | | 375/240.1 |
| 2008/0192052 A1* | 8/2008 | Ljung | | G06T 3/4007 |
| | | | | 345/426 |
| 2008/0267291 A1* | 10/2008 | Vieron | | H04N 19/30 |
| | | | | 375/E7.17 |
| 2009/0003795 A1* | 1/2009 | Yashima | | H04N 21/4312 |
| | | | | 386/230 |
| 2009/0153493 A1* | 6/2009 | Mizutani | | G06F 3/04883 |
| | | | | 345/173 |
| 2010/0034269 A1* | 2/2010 | Vieron | | H04N 19/112 |
| | | | | 375/E7.076 |
| 2010/0079609 A1* | 4/2010 | Hwang | | G06T 3/4053 |
| | | | | 348/222.1 |
| 2010/0097379 A1* | 4/2010 | Choi | | G06F 3/1446 |
| | | | | 345/1.3 |
| 2011/0193978 A1* | 8/2011 | Wu | | H04N 5/23267 |
| | | | | 348/208.6 |
| 2013/0120388 A1* | 5/2013 | O'Donnell | | G06T 15/005 |
| | | | | 345/428 |
| 2014/0086479 A1* | 3/2014 | Luo | | G06K 9/6249 |
| | | | | 382/156 |
| 2014/0355664 A1* | 12/2014 | Hardy | | H04N 19/17 |
| | | | | 375/240.02 |
| 2017/0223349 A1* | 8/2017 | Cheng | | H04N 19/436 |
| 2018/0033405 A1 | 2/2018 | Tall et al. | | |
| 2018/0136720 A1* | 5/2018 | Spitzer | | G06F 3/013 |
| 2018/0160113 A1* | 6/2018 | Jeong | | H04N 19/109 |
| 2018/0192076 A1* | 7/2018 | Ikai | | H04N 19/176 |
| 2019/0043167 A1* | 2/2019 | Steyskal | | G06T 3/4038 |
| 2019/0273910 A1 | 9/2019 | Malaika | | |
| 2020/0260063 A1* | 8/2020 | Hannuksela | | H04N 21/8456 |
| 2020/0374552 A1* | 11/2020 | Skupin | | H04N 19/124 |
| 2021/0281852 A1* | 9/2021 | Alshina | | H04N 19/159 |
| 2021/0329265 A1* | 10/2021 | Wang | | H04N 19/66 |
| 2021/0368185 A1* | 11/2021 | Zhang | | H04N 19/66 |
| 2021/0392349 A1* | 12/2021 | Chang | | H04N 19/105 |
| 2021/0409737 A1* | 12/2021 | Gao | | H04N 19/70 |
| 2021/0409738 A1* | 12/2021 | Gao | | H04N 19/132 |
| 2022/0046270 A1* | 2/2022 | Kim | | H04N 19/91 |
| 2022/0109865 A1* | 4/2022 | Deshpande | | H04N 19/159 |
| 2022/0141475 A1* | 5/2022 | Herrou | | H04N 19/147 |
| | | | | 375/240.16 |
| 2022/0150529 A1* | 5/2022 | Lim | | H04N 19/85 |
| 2022/0150544 A1* | 5/2022 | Deng | | H04N 19/436 |
| 2022/0201307 A1* | 6/2022 | Yea | | H04N 19/117 |
| 2022/0256148 A1* | 8/2022 | Zhang | | H04N 19/46 |

* cited by examiner

METHOD OF TRANSPORTING A FRAMEBUFFER

TECHNICAL FIELD

The present disclosure relates to the transmission of a framebuffer in an image display system arranged for displaying streamed images, such as a VR/AR system.

BACKGROUND

Image data are often transported in framebuffers across a digital display interface. Known such interfaces include DisplayPort and MIPI. Normally, the pixels are streamed one image line at a time at a rate of 60-90 Hz. Current systems are well adapted to the display of video streams, but VR/AR systems typically require a much higher resolution, which leads to higher requirements on the transporting methods.

SUMMARY

An object of the present disclosure is to enable faster transmission of image data over a digital display interface.

This is achieved according to the present disclosure by a method of transmitting image data over a digital display interface in an image display system, comprising dividing the image data into framebuffers, each framebuffer comprising a number of pixels to be displayed as an image on a display unit in the image display system, the method comprising for each framebuffer:
dividing the framebuffer into a number of vertical stripes, each stripe comprising one or more scanlines,
dividing each vertical stripe into at least a first and a second block, each of the first and the second block comprising pixel data to be displayed in an area of the image, and storing first pixel data in the first block with a first resolution and second pixel data in the second block having a second resolution which is lower than the first resolution,
transmitting the framebuffer over the digital display interface to a decoder unit, and
unpacking the framebuffer in a decoder unit, upscaling the pixel data in the second block to compensate for the lower second resolution and optionally upscaling the pixel data in the first block.

The disclosure also relates to an image display system arranged to display an image to a user, said image display system comprising a display stream source arranged to provide a stream of image data, an encoder arranged to convert the stream of image data into a packed display stream, a decoder arranged to receive and decode the framebuffers and forward the decoded display stream to the display, wherein the encoder is arranged to pack the data into framebuffers, each framebuffer comprising image data to be displayed as an image in the image display system, said framebuffer package comprising at least a first and a second block, each block comprising pixel data to be displayed in an area of the image, the first block comprising pixel data stored with a first resolution and the second block comprising second pixel data stored with a second resolution, which is lower than the first resolution and the decoder is arranged to unpack the framebuffers, adding pixel data in the second block to compensate for the lower second resolution and displaying the image.

Hence, according to the disclosure, the time to transmit a full framebuffer is reduced by reducing the amount of pixel data that is to be transmitted in some areas of the image, in particular in areas of the image that are outside of the viewer's focus. This means that foveation is utilized to reduce the amount of image data needed in parts of the image that are outside the area that the user is focusing on.

The disclosure also relates to a computer program product for performing the methods disclosed in this document, and a framebuffer package comprising image data to be displayed as an image in an image display system, said framebuffer package comprising at least a first and a second block, each block comprising pixel data to be displayed in an area of the image, the first block comprising pixel data stored with a first resolution and the second block comprising second pixel data stored with a second resolution, which is lower than the first resolution.

The devices and methods discussed in this disclosure are useful for any type of image display system for displaying streamed images, in which it is advantageous to vary the resolution in the images. In particular, this applies to VR/AR systems.

ACRONYMS

AR—augmented reality
DDC/CI—display data channel/command interface
DDC—display data channel
DSC—display stream compression
EDID—extended display identification data
FPGA—field programmable gate array
GPU—graphics processing unit
RAM—random access memory
USB—universal serial bus
VR—virtual reality

BRIEF DESCRIPTION OF DRAWINGS

Embodiments of the present disclosure will now be described, by way of example only, with reference to the following diagrams wherein.

DETAILED DESCRIPTION OF EMBODIMENTS

Figure 1:
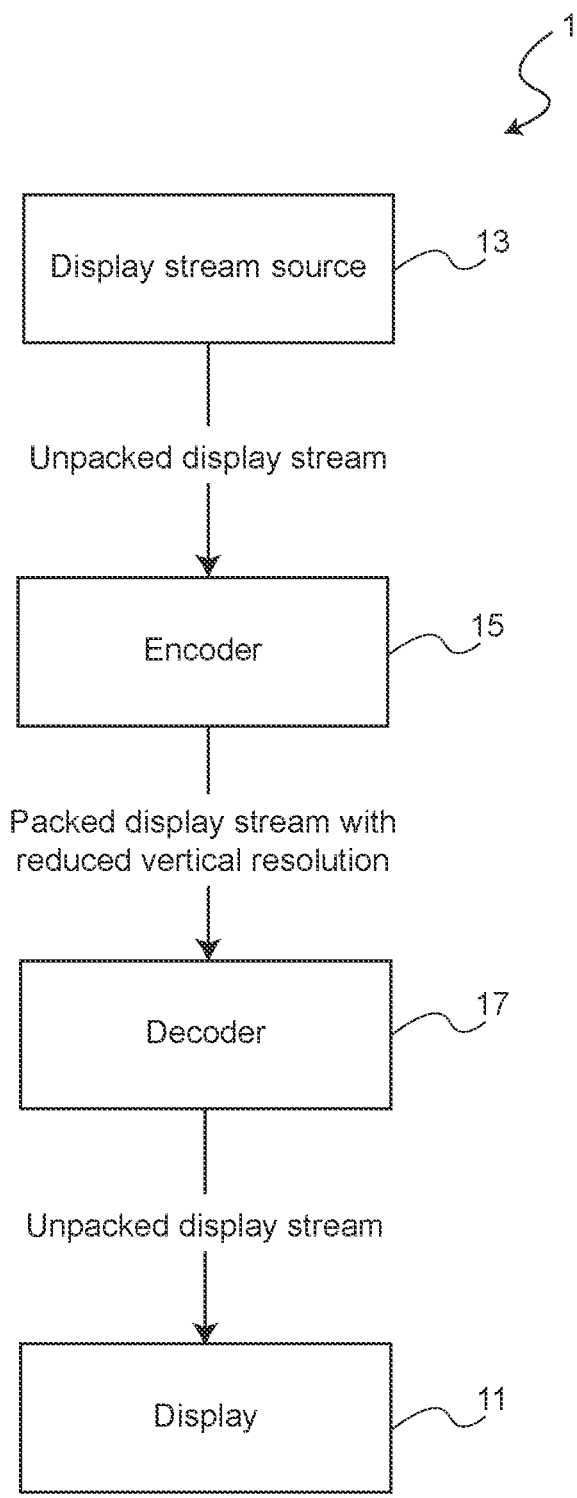
FIG. 1 displays on a general level the structure of a system in which the present invention may be used.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The various aspects of the invention are particularly useful in image display systems in which the images may suitably be displayed with varying resolution. One example of such systems is a VR/AR system in which foveation is often applied to display a higher resolution in the central part of the image compared to the peripheral parts.

An aspect of this disclosure relates to a method of transmitting image data over a digital display interface in an image display system, comprising dividing the image data into framebuffers, each framebuffer comprising a number of pixels to be displayed as an image on a display unit in the image display system, the method comprising, for each framebuffer:
dividing the framebuffer into a number of vertical stripes, each stripe comprising one or more scanlines,
dividing each vertical stripe into at least a first and a second block, each of the first and the second block comprising pixel data to be displayed in an area of the image, and storing first pixel data in the first block with a first resolution and second pixel data in the second block,
having a second resolution which is lower than the first resolution,
transmitting the framebuffer over the digital display interface to a decoder unit, and
unpacking the framebuffer in a decoder unit, upscaling the pixel data in the second block to compensate for the lower second resolution and optionally upscaling the pixel data in the first block.

The disclosure also relates to an image display system arranged to display an image to a user, said image display system comprising a display stream source arranged to provide a stream of image data, an encoder arranged to convert the stream of image data into a packed display stream, a decoder arranged to receive and decode the framebuffers and forward the decoded display stream to the display, wherein the encoder is arranged to pack the data into framebuffers, each framebuffer comprising image data to be displayed as an image in the image display system, said framebuffer package comprising at least a first and a second block, each block comprising pixel data to be displayed in an area of the image, the first block comprising pixel data stored with a first resolution and the second block comprising second pixel data stored with a second resolution, which is lower than the first resolution, and the decoder is arranged to unpack the framebuffers, adding pixel data in the second block to compensate for the lower second resolution and displaying the image. In some embodiments, the encoder is hardwired to arrange the image data into blocks of different resolution.

The disclosure also relates to a framebuffer package comprising image data to be displayed as an image in an image display system, said framebuffer package comprising at least a first and a second block, each block comprising pixel data to be displayed in an area of the image, the first block comprising pixel data stored with a first resolution and the second block comprising second pixel data stored with a second resolution, which is lower than the first resolution.

The framebuffer package may further comprise metadata, said metadata comprising instructions on how to decode the image data in the framebuffer package, in particular information about where in the image the data from each block is to be displayed and with what amount of upscaling. In this case, the method comprises the step of including metadata in the framebuffer, said metadata comprising instructions on how to decode each stripe. Preferably, in this case, the encoder is arranged to include metadata in each framebuffer, said metadata comprising instructions on how to decode the image data in the framebuffer package, in particular information about where in the image the data from each block is to be displayed and with what amount of upscaling. Including the metadata related to a framebuffer in the framebuffer itself allows an efficient way of providing the metadata to the decoder. Alternatively, the metadata may be transferred from the encoder to the decoder separately from the framebuffer by any suitable means.

Typically, the first block holds pixel data of the first resolution to be displayed in a first part of the image, the stripe further comprising two additional blocks having the second resolution to be displayed on opposite sides of the first part of the image. In preferred embodiments, the frame comprises two further blocks having a third resolution which is lower than the second resolution, to be displayed on opposite sides of the additional blocks. As will be understood, the areas of different resolutions may be arranged in any suitable way.

The resolution to be used in each of the blocks may be selected freely. In some embodiments, the first resolution is the same as the resolution in a source image and the second resolution is ¼ of the first resolution. This allows the maximum available resolution to be maintained in the most important part or parts of the image. If there are also blocks having a third resolution, this third resolution may be 1/16 of the first resolution.

The disclosure also relates to a computer program product for controlling the transfer of image data across a digital picture interface, said computer program product comprising computer-readable code means which when run in a processor controlling an image display system will cause the system to perform the transfer according to the methods as discussed in this disclosure.

The blocks are transmitted in the same way as any image data, which means that standard compression methods can be applied to the blocks, including display stream compression (DSC).

DETAILED DESCRIPTION OF DRAWINGS

FIG. 1 is a general structural overview of a VR/AR system 1, as an example of an image display system, in which the present invention may be implemented, comprising a display unit 11 on which an image stream is to be displayed to a user. The display unit may be any suitable display unit typically arranged to display a VR/AR image stream. A display stream source 13 provides an unpacked stream of image data to an encoder 15 arranged to encode the image data into a packed display stream with reduced vertical resolution. This involves converting the image data into framebuffers including blocks of different resolutions as discussed above. The reduced resolution in some of the blocks leads to a reduced number of pixels to be transferred, making it possible to transfer more framebuffers in the same amount of time with the same bandwidth. As discussed above, metadata comprising instructions for how to unpack the image data should also be transferred, either as a part of the respective framebuffer or separately through any suitable means.

A decoder is arranged to receive the packed display stream and the metadata and to unpack the framebuffers according to the instructions in the metadata. This involves, for any block that has a reduced resolution, to add pixels to make up for the reduced number of pixels in the block. How many pixels to add depends on how much the resolution is reduced. For example, three pixels may be added, to convert one pixel into a block of 2×2 pixels, or 15 pixels may be added, to convert one pixel into a block of 4×4 pixels. The image data, decoded and with the added pixels to make up for the reduced resolution in some parts of the image, are then displayed on the display unit.

Figure 2:
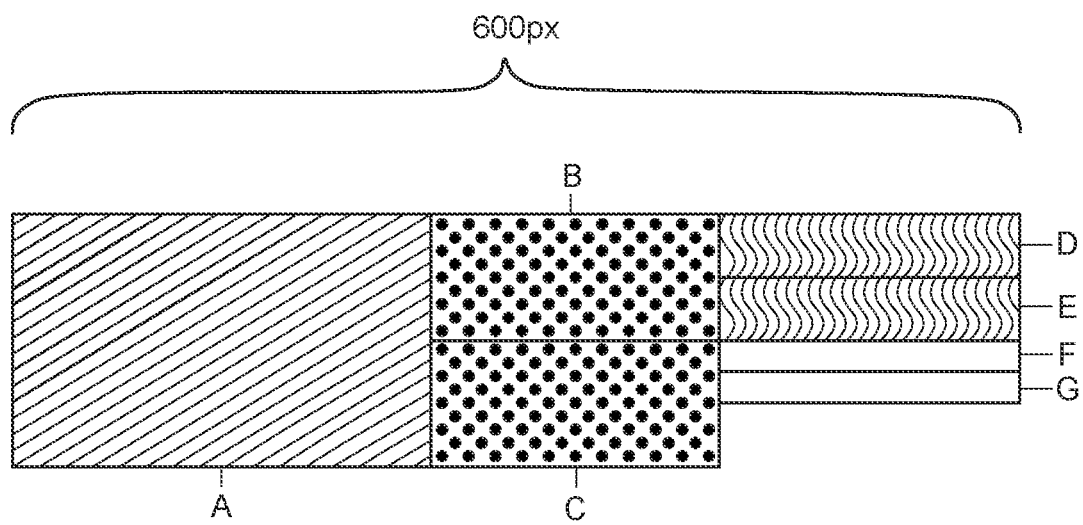
FIG. 2 is a schematic illustration of a part of framebuffer to be transferred on the display interface.
Figure 2:
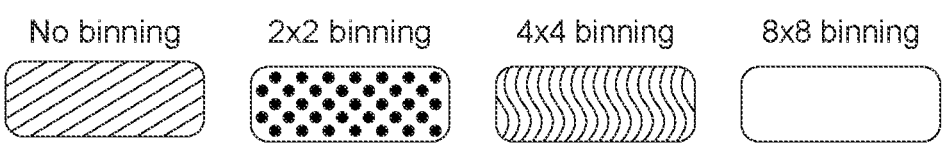

FIG. 2 is a schematic illustration of a part of a framebuffer that has been adapted according to an embodiment of the present disclosure. The framebuffer is to be transferred over a digital display interface such as DisplayPort cable. In the example shown in FIG. 2, the framebuffer has been divided into vertical stripes comprising 16 lines and FIG. 2 shows one such stripe. The stripe is constructed on the GPU from a source signal of 3500×16 pixels applying varying degrees of downscaling, or binning, as will be discussed in the following. The downscaling may be performed using a custom shader. The stripe has been divided into 7 blocks labelled A, B, C, D, E, F, and G. Block A is the largest of the six blocks, comprising 300×16 pixels, thereby covering all 16 stripes. Blocks B and C each has 200×8 pixels, together covering all 16 stripes. Blocks D and E both have 100×4 pixels and blocks F and G both have 100×2 pixels.

In this example, block A holds image data of the highest resolution, which is intended to be displayed in the area of the image that the user is focusing on, for example, in the middle of the image. Blocks B and C hold image data of the second highest resolution, intended to be displayed in areas adjacent to the image data of block A, typically on either side. Blocks D and E hold image data to be displayed in areas adjacent to the image data of block B and C, respectively, and blocks F and G hold image data of the lowest resolution to be displayed near the edges of the image. There is also empty space in this framebuffer, after block G, which can be used to transmit control data.

Figure 3:
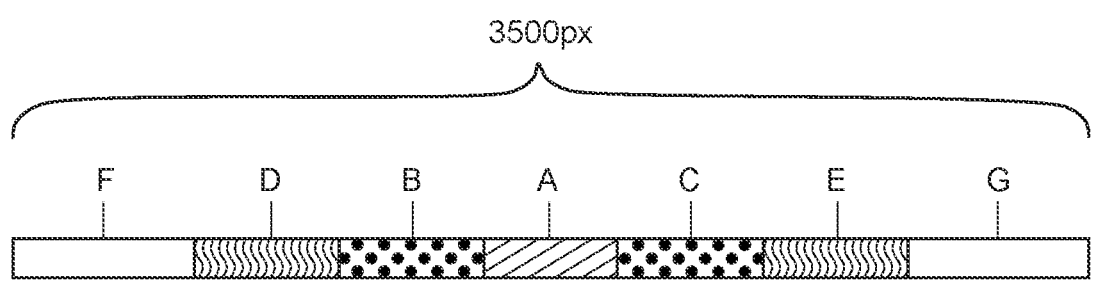
FIG. 3 is a schematic illustration of the framebuffer part, unpacked for display.
Figure 3:
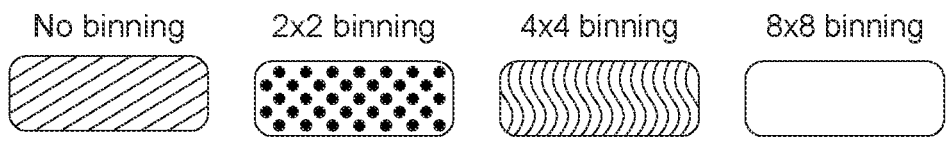

FIG. 3 illustrates how the data of this stripe of 16 lines is to be displayed in the image. For this purpose, the receiving end contains a custom hardware block, for example a field programmable gate array (FPGA) device, to perform unpacking and reconstruct the original image. The image data from block A is displayed in the middle of the image with the same resolution as in FIG. 2, that is, 300 pixels in each of the 16 lines. The image data from blocks B and C are displayed on either side of block A as 400 pixels in each of the 16 lines. Each pixel in block B and C in the framebuffer is shown as 4 pixels in the image, that is, with ¼ of the resolution of the data from block A. Blocks D and E are displayed outside of block B and C, respectively, with ¹⁄₁₆ of the resolution that they have in the framebuffer and blocks F and G are displayed near the respective edge of the image with ¹⁄₆₄ of the resolution that they have in the framebuffer. In this way, the amount of data that needs to be transmitted for areas outside of the focus area of the image is significantly reduced.

It follows that metadata must be provided, to give instructions on how to display the image data of the framebuffer. Specifically, the instructions should detail for each block which part of the image the image data from this block should be displayed in, and also how much the image data should be upscaled, that is, how many pixels in the image should be covered by each pixel in the block. This is reflected in FIGS. 2 and 3 by different patterns, where a white block means that the resolution should not be changed, and a darker pattern indicates that each pixel should be displayed in a bin of a higher number of pixels.

The metadata describing how each stripe is to be decoded can be either embedded into the source signal itself, as part of the image data, transferred as part of display data channel/extended display identification data (DDC/EDID), or sent beforehand via some other channel such as USB. In the example of FIG. 2, as can be seen, there is room for the metadata in the framebuffer after the data of blocks F and G.

Preferably, when generating the framebuffer as shown in FIG. 2, the pixel values stored in each block are generated based on image data based on a number of pixels in the image data corresponding to the number of pixels each pixel in the framebuffer should cover in the image. The pixel value to be stored may be generated in any suitable way, for example as an average value of the pixel values in the bin.

As will be understood, the number of blocks and the size of each block in FIG. 2 is intended only as an example, the important thing being that the blocks have different resolutions, depending on which part of the image its data is intended to be displayed in.

The number of stripes, and their sizes may be selected freely. In the example it is assumed that each stripe has 16 image lines. It would be possible to let each strip consist of one line although this would limit how low the lowest resolution could be.

In the extreme case, the framebuffer is not divided into several stripes, but the whole image is treated as one stripe including a number of blocks.

Figure 4:
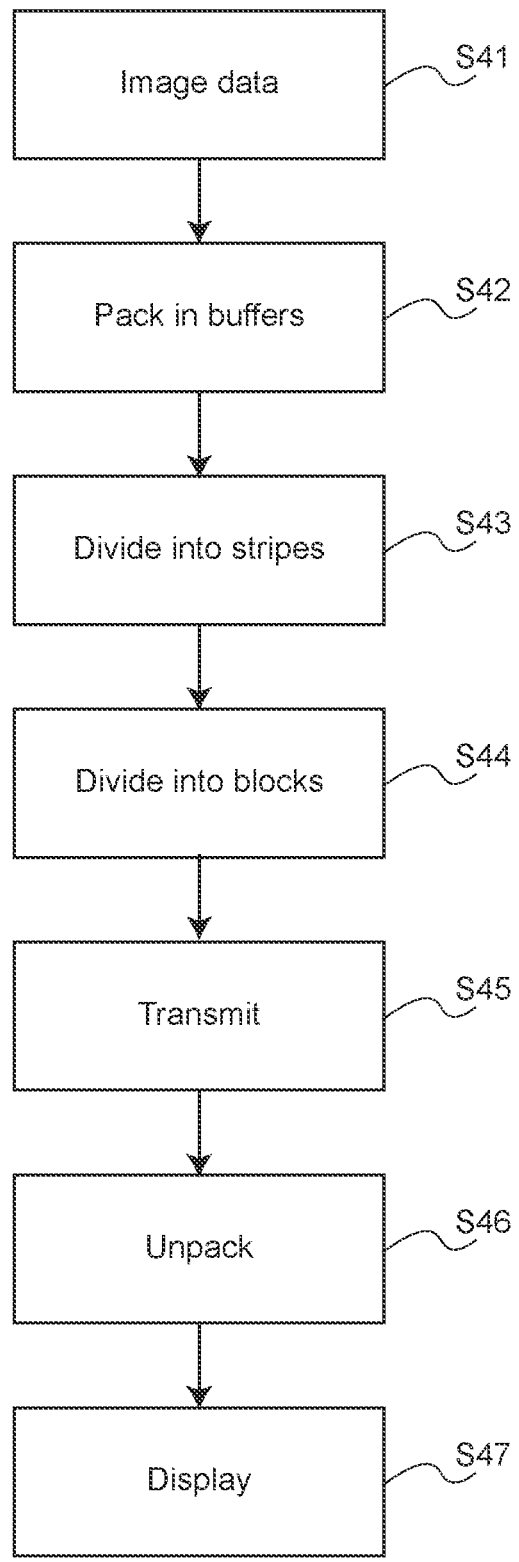
FIG. 4 is a flow chart of a method according to the present disclosure.

FIG. 4 is a flowchart of a method that may be used according to the present disclosure, with reference to the system shown in FIG. 1.

In a first step S41 a stream of image data is received from a display stream source 13 in an encoder 15. In a second step S42 the stream is packed into framebuffers as discussed above in connection with FIG. 1. Steps S42, S43 and S44 are performed in the encoder 15.

In step S43, the framebuffers are divided into stripes, in the encoder. The examples above include 16 stripes, but it is possible to use only one stripe for the whole image. As discussed above, the stripe may comprise a suitable number of lines.

In step S44, each stripe is divided into blocks, each block comprising image data stored with a particular resolution.

In step S45, the framebuffers, divided according to steps S43 and S44, are transmitted to the decoder 17.

In step S46, the decoder 17 unpacks the image data. This includes upscaling data in some or all of the blocks in dependence of the resolution. In the example of FIG. 2, the data in block A would not need to be upscaled since it was stored with full resolution. The data in blocks B and C would be upscaled ×4, that is, the value of each pixel in this block would be used for four pixels in a 2×2 square. The data in blocks D and E would be upscaled to 16 pixels in a 4×4 square, and the data in blocks F and G would be upscaled to 64 pixels in an 8×8 square.

Finally, in step S47, the image data including data from all the blocks, upscaled according to step S46 are displayed on the display unit 11.

Each packed stripe must be buffered into the FPGA entirely before the reconstruction can start. For a 3 k display this would be around 60 kilobytes of random access memory (RAM) (3072 pixels with 5:1 compression, 3 bytes per pixel, 16 scanlines per stripe, double buffering for stripes).

The locations of each block in the unpacked image can be different each frame and each stripe, depending on where the full resolution area should be located on the display in each frame. There are a few options on how to achieve this, depending on the FPGA gate budget:

Send the configuration data encoded into an unused area in the packed image. This can be implemented fully in the graphics processing unit (GPU). Extra care must be taken in this case to ensure that DSC does not mangle the data.

Send the configuration data over display data channel/command interface (DDC/CI). This implementation would require support from a graphics processing unit (GPU) driver This probably would not allow full per-stripe control of the block configuration, but rather some pre-defined curve around a full-resolution focal point.

Send the configuration data over a universal serial bus (USB) sidechannel. This would require extra hardware and USB drivers, thus adding overall complexity.

Similarly, there are a few options on how flexible the block configuration can be:

The option ensuring the greatest flexibility would be to allow full control over all block sizes and their locations This would require a relatively large metadata block, which has to be unique per stripe.

A simpler implementation, which would still provide considerable flexibility would be a selection of pre-defined block configurations, with optional location adjustment.

A more restricted implementation would be to define a per-frame curve around a central point: In this option only the central focus point coordinates and perhaps some curve parameters are provided to the display and the block configuration for each stripe is determined from those parameters.

The invention claimed is:

1. A method of transmitting image data over a digital display interface in an image display system, comprising dividing the image data into framebuffers, each framebuffer comprising a number of pixels to be displayed as an image on a display unit in the image display system, the method comprising for each framebuffer:
dividing the framebuffer into a number of vertical stripes, each stripe comprising one or more scanlines,
dividing each vertical stripe into a plurality of blocks, each of the plurality of blocks comprising pixel data to be displayed in an area of the image, and storing first pixel data in a first block with a first resolution and second pixel data in second blocks having second resolutions lower than the first resolution and holding pixel data to be displayed outside of opposite sides of the first pixel data, wherein the second blocks are positioned on opposite sides of the first block in the frame buffer,
transmitting the framebuffer over the digital display interface to a decoder unit, and
unpacking the framebuffer in a decoder unit, upscaling the pixel data in the second block to compensate for the lower second resolution and optionally upscaling the pixel data in the first block.

2. A method according to claim 1, comprising the step of including metadata in the framebuffer, said metadata comprising instructions on how to decode each stripe.

3. A method according to claim 2, wherein the metadata comprises information about where in the image the data from each block is to be displayed and with what amount of upscaling.

4. A method according to claim 1, comprising the step of transferring metadata from the encoder to the decoder separately from the framebuffer.

5. A method according to claim 1, wherein the first block holds pixel data of the first resolution to be displayed in a first part of the image, the stripe further comprising two additional blocks having the second resolutions to be displayed on opposite sides of the first part of the image.

6. A method according to claim 5, further comprising two further blocks having a third resolution which is lower than the second resolutions, to be displayed on opposite sides of the additional blocks.

7. A method according to claim 1, wherein the first resolution is the same as the resolution in a source image and at least one of the second resolutions is ¼ of the first resolution.

8. A method according to claim 7, wherein the first resolution is the same as the resolution in a source image and at least one of the second resolutions is ¼ of the first resolution, and the third resolution is ¹⁄₁₆ of the first resolution.

9. A method according to claim 1, wherein each stripe comprises 16 scanlines.

10. A computer program product for controlling the transfer of image data across a digital picture interface, said computer program product comprising a non-transitory storage medium having thereon computer-readable code means which when run in a processor controlling an image display system will cause the system to perform the transfer according to the method according to the following steps:
dividing incoming image data into framebuffers, each framebuffer comprising a number of pixels to be displayed as an image on a display unit in the image display system,
for each framebuffer:
dividing the framebuffer into a number of vertical stripes, each stripe comprising one or more scanlines,
dividing each vertical stripe into a plurality of blocks, each of the plurality of blocks comprising pixel data to be displayed in an area of the image, and storing first pixel data in a first block with a first resolution and second pixel data in second blocks having second resolutions lower than the first resolution and holding pixel data to be displayed outside of opposite sides of the first pixel data, wherein the second blocks are positioned on opposite sides of the first block in the frame buffer,
transmitting the framebuffer over the digital display interface to a decoder unit, and
unpacking the framebuffer in a decoder unit, upscaling the pixel data in the second block to compensate for the lower second resolution and optionally upscaling the pixel data in the first block.

11. A computer program product according to claim 10, wherein the code means are arranged to make the system include metadata in the framebuffer, said metadata comprising instructions on how to decode each stripe.

12. A computer program product according to claim 10, wherein the code means are arranged to make the first block hold pixel data of the first resolution to be displayed in a first part of the image, the stripe further comprising two additional blocks having the second resolutions to be displayed on opposite sides of the first part of the image.

13. A computer program product according to claim 12, wherein the code means are arranged to create two further blocks having a third resolution which is lower than the second resolutions, to be displayed on opposite sides of the additional blocks.

14. A framebuffer package comprising image data to be displayed as an image in an image display system, said framebuffer package comprising a plurality of blocks, each block comprising pixel data to be displayed in an area of the image, a first block comprising pixel data stored with a first resolution and second blocks comprising second pixel data stored with second resolutions lower than the first resolution and holding pixel data to be displayed outside of opposite sides of the first pixel data, wherein the second blocks are positioned on opposite sides of the first block in the frame buffer.

15. A framebuffer package according to claim 14, comprising metadata, said metadata comprising instructions on how to decode the image data in the framebuffer package, in particular information about where in the image the data from each block is to be displayed and with what amount of upscaling.

16. An image display system arranged to display an image to a user, said image display system comprising a display stream source arranged to provide a stream of image data, an encoder arranged to convert the stream of image data into a packed display stream, a decoder arranged to receive and decode the framebuffers and forward the decoded display stream to the display, wherein the encoder is arranged to pack the data into framebuffers, each framebuffer comprising image data to be displayed as an image in the image display system, said framebuffer package comprising a plurality of blocks, each block comprising pixel data to be displayed in an area of the image, a first block comprising pixel data stored with a first resolution and second blocks comprising second pixel data stored with second resolutions lower than the first resolution and holding pixel data to be displayed outside of opposite sides of the first pixel data, wherein the second blocks are positioned on opposite sides of the first block in the frame buffer, and the decoder is arranged to unpack the framebuffers, adding pixel data in the second blocks to compensate for the lower second resolution and displaying the image.

17. An image display system according to claim 16, wherein the encoder is arranged to include metadata in each framebuffer, said metadata comprising instructions on how to decode the image data in the framebuffer package, in particular information about where in the image the data from each block is to be displayed and with what amount of upscaling.

18. An image display system according to claim 16, wherein the encoder is hardwired to arrange the image data into blocks of different resolution.

* * * * *